(12) United States Patent
Thomas et al.

(10) Patent No.: US 10,922,125 B2
(45) Date of Patent: Feb. 16, 2021

(54) CAPABILITY LIVENESS OF CONTAINERIZED SERVICES

(71) Applicant: ENTIT SOFTWARE LLC, Sanford, NC (US)

(72) Inventors: Kishan Thomas, Sunnyvale, CA (US); Stephen Lee Kirkendall, Santa Clara, CA (US); Dongye Pan, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 16/440,624

(22) Filed: Jun. 13, 2019

(65) Prior Publication Data

US 2020/0394062 A1 Dec. 17, 2020

(51) Int. Cl.
| | | |
|---|---|---|
| *H04L 12/24* | (2006.01) | |
| *G06F 9/455* | (2018.01) | |
| *G06F 11/34* | (2006.01) | |
| *G06F 40/205* | (2020.01) | |

(52) U.S. Cl.
CPC ...... *G06F 9/45558* (2013.01); *G06F 11/3476* (2013.01); *G06F 40/205* (2020.01);
(Continued)

(58) Field of Classification Search
CPC . G06F 9/455; G06F 9/45558; H04L 41/5009; H04L 41/5025; H04L 67/10; H04L 41/16; H04L 41/5054; G06N 20/00
See application file for complete search history.

(56) References Cited

U.S. PATENT DOCUMENTS 6,148,323 A * 11/2000 Whitner .................. G06F 11/28
714/E11.178
9,804,952 B1 * 10/2017 Cohen ................. G06F 11/3644
(Continued)

FOREIGN PATENT DOCUMENTS

| CN | 107256178 A | 10/2017 |
|---|---|---|
| CN | 108093046 A | 5/2018 |

(Continued)

OTHER PUBLICATIONS

Victor Medel, Modelling Performance & Resource Management in Kubernetes, 2016 IEEE/ACM 9th International Conference on Utility and Cloud Computing, pp. 258-262.*
(Continued)

*Primary Examiner* — Chirag R Patel

(57) ABSTRACT

An apparatus may include a processor that may access and analyze a live log stream of activity of the containerized service and determine whether the containerized service is able to provide a capability of the service based on the analysis. For example, the processor may determine whether the containerized service is executing but is in a hung state and cannot provide the capability. To do so, the processor may parse the live log stream for comparison with log patterns that indicate that the service is no longer able to provide the capability. The patterns may be generated based on observations of output by services that are hung or otherwise cannot provide their respective capabilities. The processor may cause the container to be restarted when the analysis indicates that the capability is not being provided by the containerized service, such as when the containerized service is in a hung state.

19 Claims, 8 Drawing Sheets

(52) U.S. Cl.
CPC ............ *G06F 2009/45575* (2013.01); *G06F 2009/45591* (2013.01); *G06F 2009/45595* (2013.01)

(56) References Cited

U.S. PATENT DOCUMENTS

| | | | |
|---|---|---|---|
| 9,996,380 B2 | 6/2018 | Singh et al. | |
| 2014/0298091 A1* | 10/2014 | Carlen | G06F 9/54 714/15 |
| 2017/0118137 A1* | 4/2017 | Nanjundaswamy | H04L 67/42 |
| 2018/0024889 A1* | 1/2018 | Verma | G06F 11/1438 714/15 |
| 2018/0107586 A1 | 4/2018 | Vyas et al. | |
| 2018/0210801 A1* | 7/2018 | Wu | H04L 43/10 |
| 2018/0349199 A1 | 12/2018 | Vyas et al. | |
| 2020/0067789 A1* | 2/2020 | Khuti | G06N 5/046 |

FOREIGN PATENT DOCUMENTS

| | | |
|---|---|---|
| CN | 108696550 A | 10/2018 |
| WO | WO-2006107340 A3 | 4/2009 |
| WO | WO-2017169949 A1 | 10/2017 |
| WO | WO-2018052528 A1 | 3/2018 |

OTHER PUBLICATIONS

Kirill Goltsman, Cluser-level Logging in Kubernetes with Fluentd, Supergiant.io-Medium, Feb. 12, 2019, pp. 1-17.*
Redhat Inc.,"Application Health", Developer Guide, OpenShift Container Platform 3.6, 2019, 4 pages. https://docs.openshift.com/container-platform/3.6/dev_guide/application_health.html.
Google Cloud, "Best Practices for Operating Containers", reterieved from internet on Mar. 1, 2019, 15 pages. https://cloud.google.com/solutions/best-practices-for-operating-containers.

* cited by examiner

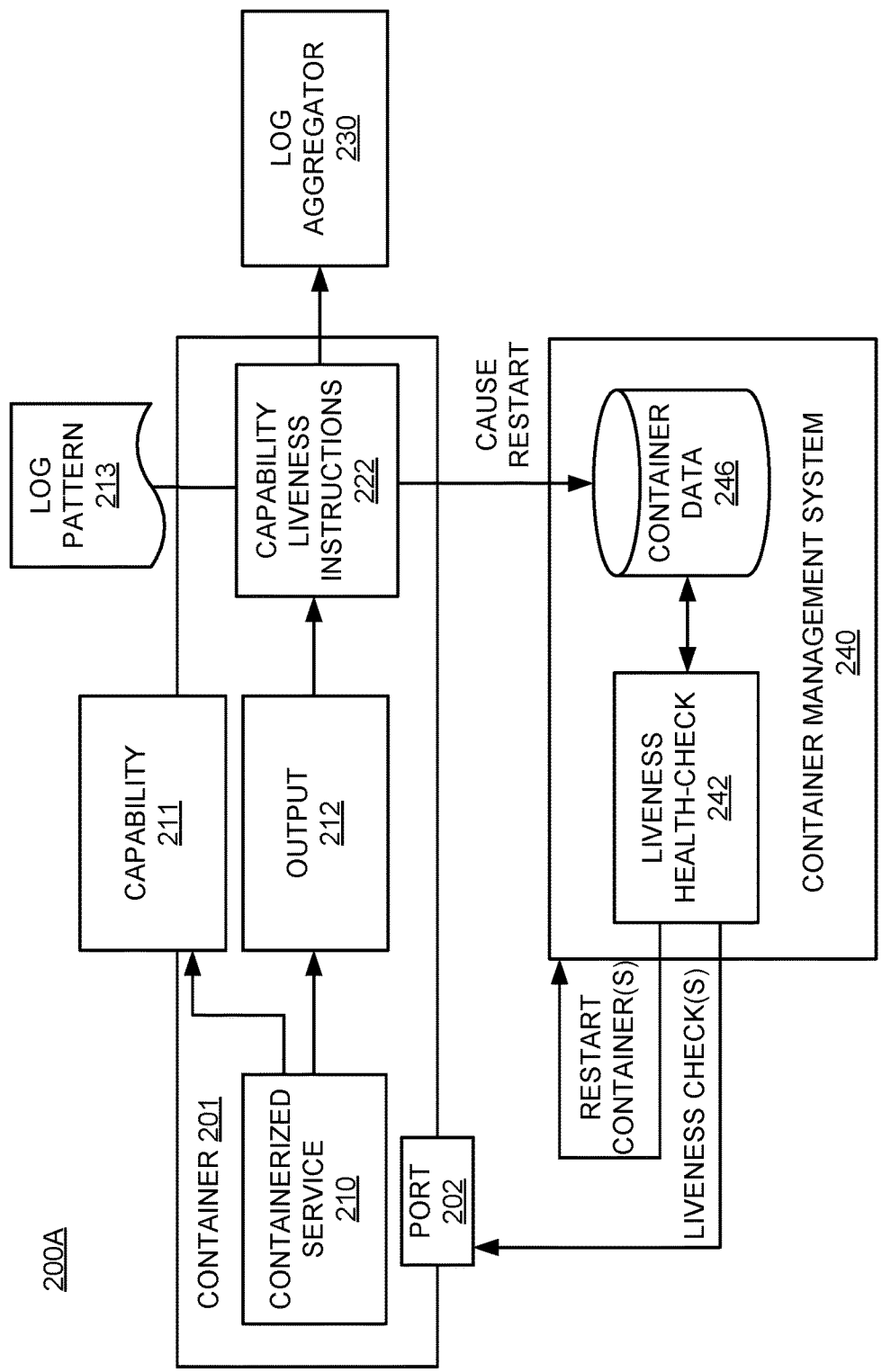

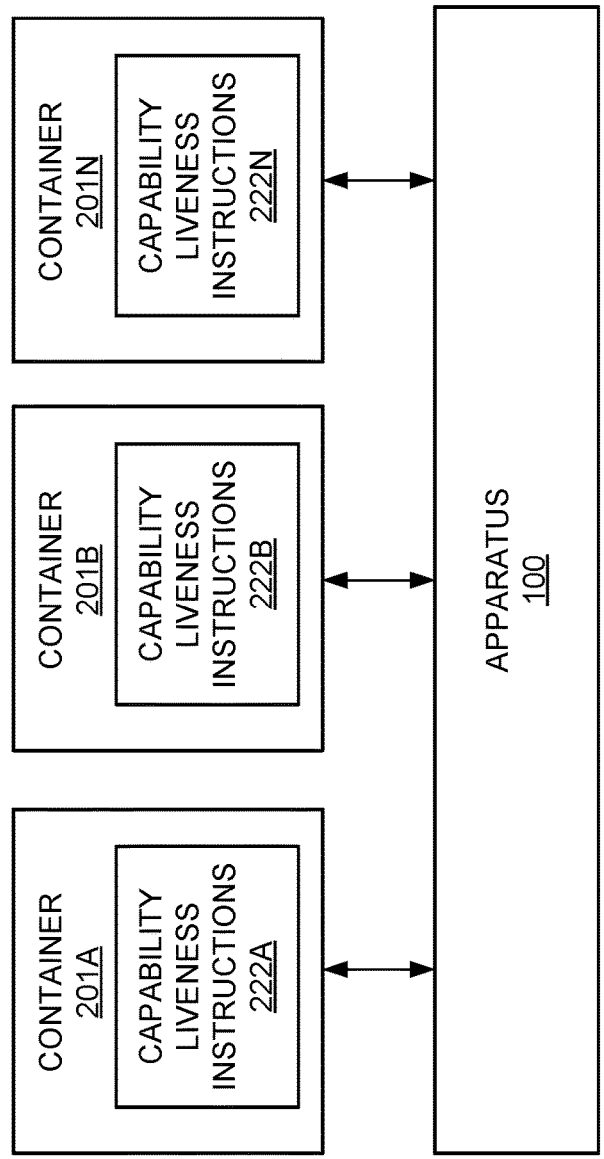

NON-TRANSITORY COMPUTER READABLE STORAGE MEDIUM
500

ACCESS AN OUTPUT OF A SERVICE TO EXECUTE IN A CONTAINER, WHEREIN THE SERVICE IS TO PROVIDE A CAPABILITY BASED ON SUCCESSFUL EXECUTION OF THE SERVICE IN THE CONTAINER
502

PARSE THE OUTPUT BASED ON A LOG PATTERN
504

DETERMINE, BASED ON THE PARSED OUTPUT, THAT THE SERVICE IS IN A HUNG STATE WITHOUT EXITING
506

CAUSE THE CONTAINER TO BE RESTARTED RESPONSIVE TO THE DETERMINATION THAT THE SERVICE IS IN THE HUNG STATE
508

*FIG. 5*

CAPABILITY LIVENESS OF CONTAINERIZED SERVICES

BACKGROUND

Containers in computer technology are portable, lightweight, packages that include components to execute applications that provide services (so-called containerized services). Containers may execute on top of a container platform, such as the DOCKER platform, and a common operating system provided by a hardware or virtual host. Containers may be managed by various container management systems such as the KUBERNETES, MESOS, or DOCKER SWARM management systems. Each of these container management systems may interface with and ensure that containers are executing properly. For example, the KUBERNETES system includes liveness probes, which are container liveness checks to ensure that a container is executing. These liveness probes may operate by sending requests to a network port used by the container to connect to a network.

BRIEF DESCRIPTION OF THE DRAWINGS

Features of the present disclosure may be illustrated by way of example and not limited in the following figure(s), in which like numerals indicate like elements, in which:

FIGS. 2A-2D, respectively, show example systems that may provide containerized service capability liveness tracking;

FIG. 3 shows a block diagram of an example apparatus that may act as a node that hosts containers;

FIG. 5 depicts a block diagram of an example non-transitory machine-readable storage medium for containerized service capability liveness tracking.

DETAILED DESCRIPTION

Figure 1:
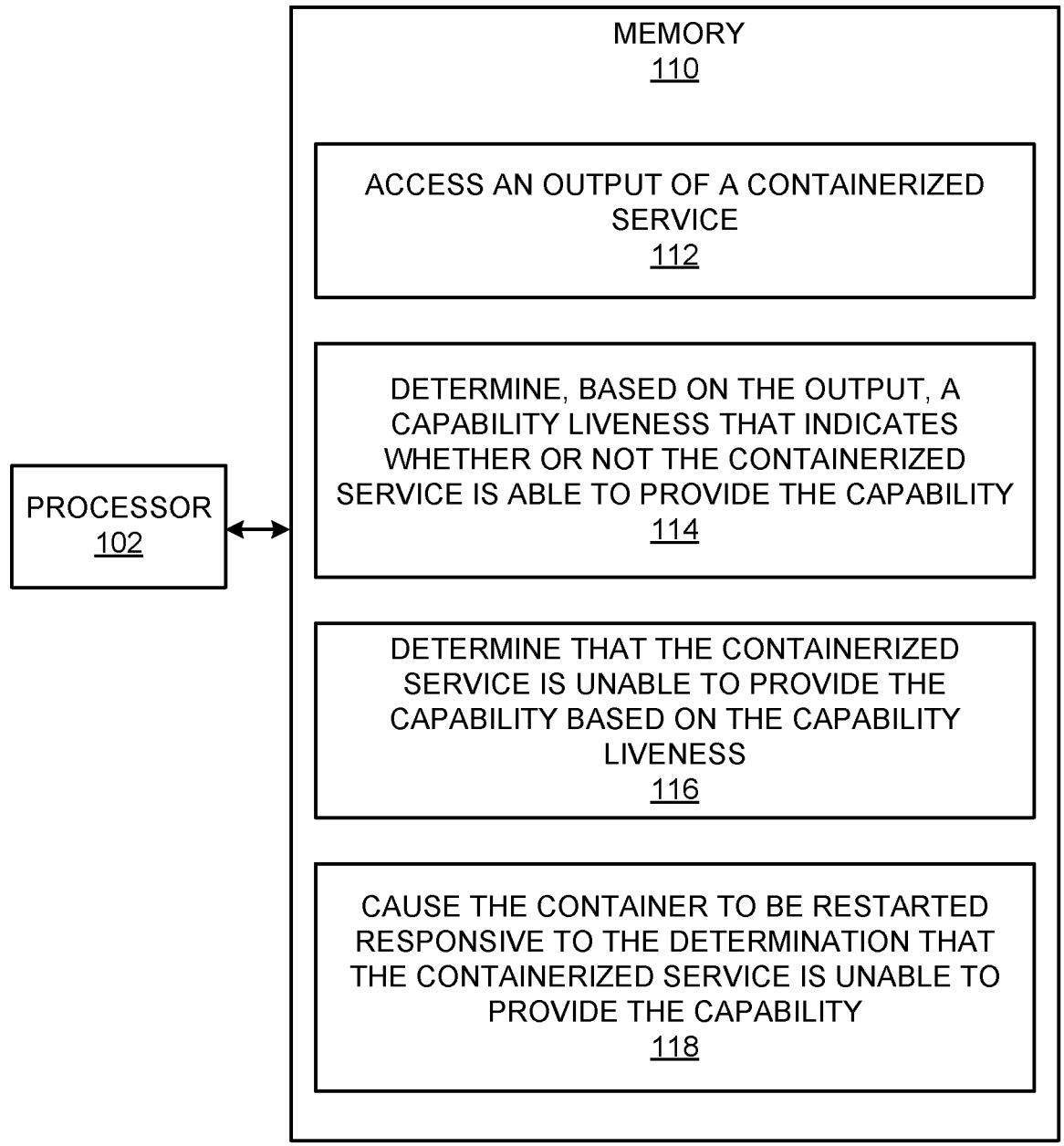
FIG. 1 shows a block diagram of an example apparatus that may provide containerized service capability liveness tracking.

For simplicity and illustrative purposes, the present disclosure may be described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" may be intended to denote at least one of a particular element. As used herein, the term "includes" means includes but not limited to, the term "including" means including but not limited to. The term "based on" means based at least in part on.

Disclosed herein are apparatuses and methods for automatically recovering services executing in a managed resource environment. In particular, the disclosure pertains to recovering containerized services that provide capabilities when executing properly, but fail to provide such capabilities when the containerized services hang without exiting or otherwise become unavailable. Oftentimes it is difficult to detect when a containerized service is not providing the capability until it is too late and data loss or other problems develop resulting from loss of the capability. Thus, it may be important to detect that containerized services are unable to provide their capabilities so that mitigative action may be taken before the problem develops.

However, while liveness probes provided by container management systems may detect that the container itself is unresponsive to network requests and therefore no longer executing, the liveness probes may fail to detect that underlying containerized services (which may or may not use or otherwise interface with the network port) are still executing but are in a hung state. For example, microservices and stream processors may not access an open port that may be used for the liveness probes and/or may not have a monitoring port that can be checked. In particular, many of the asynchronous data processing micro services reads and writes data from a message bus without the use of an open server port.

Even if the micro service accesses a port, oftentimes the port may be responsive but the service itself may be hung without processing any work or may process such work in a degraded state. Such a hung state may be caused by various issues such as deadlocks and resource unavailability, among others. When in a hung state, a containerized service may no longer respond to inputs and/or provide outputs. As such, the containerized service may no longer provide a capability that would otherwise be provided even though the containerized service is still executing in the container and even though liveness checks confirm that the container itself is responsive to network requests.

The disclosure pertains to detecting container deployed service capability liveness. A system may do so dynamically by accessing an output of a service executing in a container and determining a capability liveness that indicates whether the capability is being provided based on the output. For example, a system may access an output of the containerized service and determine that the containerized service is in a hung state based on the output. The system may include an agent that executes inside the container or another container in a sidecar pattern. The agent may intercept the output, which may include a standard output (STDOUT) that represents a live log stream of activity. STDOUT is a default descriptor for a process to write output, typically to a display screen in a terminal setting or that may be piped to another process. When the container is instantiated, the STDOUT of the service may be piped or otherwise redirected to the agent.

The system may analyze the output to determine whether the containerized service is able to perform a capability. For example, the system may parse the output for comparison with a log pattern that indicates that the service is no longer able to provide a capability. The log pattern may be customized based on observations of output by services that are hung or otherwise cannot provide the capability. The log patterns may cover various scenarios such as a specific single static message, a regular expression-based pattern, a repetition pattern with bounded thresholds, a heartbeat log message emitted periodically that can be checked with a time threshold for liveness, a compound log pattern check can also be done using individual log patterns combined using boolean logic, and/or others.

The system may cause the container to be restarted when the capability liveness check indicates that the capability is not being provided by the containerized service, such as when the containerized service is in a hung state. To cause the container to be restarted, the system may indicate, to a container management system, that the container is to be restarted.

Reference is first made to FIG. 1, which shows a block diagram of an example apparatus 100 that may provide containerized service capability liveness tracking. It should be understood that the example apparatus 100 depicted in FIG. 1 may include additional features and that some of the features described herein may be removed and/or modified without departing from any of the scopes of the example apparatus 100.

The apparatus 100 shown in FIG. 1 may be a computing device, a server, or the like. As shown in FIG. 1, the apparatus 100 may include a processor 102 that may control operations of the apparatus 100. The processor 102 may be a semiconductor-based microprocessor, a central processing unit (CPU), an application specific integrated circuit (ASIC), a field-programmable gate array (FPGA), and/or other suitable hardware device. Although the apparatus 100 has been depicted as including a single processor 102, it should be understood that the apparatus 100 may include multiple processors, multiple cores, or the like, without departing from the scopes of the apparatus 100 disclosed herein.

The apparatus 100 may include a memory 110 that may have stored thereon machine-readable instructions (which may also be termed computer readable instructions) 112-118 that the processor 102 may execute. The memory 110 may be an electronic, magnetic, optical, or other physical storage device that includes or stores executable instructions. The memory 110 may be, for example, Random Access memory (RAM), an Electrically Erasable Programmable Read-Only Memory (EEPROM), a storage device, an optical disc, and the like. The memory 110 may be a non-transitory machine-readable storage medium, where the term "non-transitory" does not encompass transitory propagating signals. Attention will now turn to operations at processor 102 to provide containerized service capability liveness tracking.

Referring to FIG. 1, the processor 102 may fetch, decode, and execute the instructions 112 to access an output of a containerized service. The containerized service may execute in a container and provide a capability based on successful execution of the containerized service in the container. As used herein, a containerized service may refer to an executable function that executes within a container to provide a capability. For example, a containerized service may include an application or other set of instructions that are executed within a container. Thus, any application or service may be containerized for portability or other needs.

A capability may refer to a functional outcome (such as a purpose or goal) of successful execution of a containerized service. Such capability may be user-facing in that the service may generate a functional outcome that may be visible or otherwise provided to an end user or may be lower-level in that the service may generate an outcome that may be used by another application or service.

The output of the containerized service (which may be accessed based on execution of instructions 112) may include an indication of events that occurred during execution of the containerized service. In some examples, the output may include a standard output (STDOUT) of the containerized service. In some examples, the output may include a standard error (STDERR) of the containerized service. In either of these examples, the containerized service may stream, as the output, a real-time log of events that occurred during execution of the containerized service. In some examples, the output may include a log file or other file that is not streamed but stored as a discrete file. In these examples, the processor 102 may access the output by accessing the discrete file.

The processor 102 may fetch, decode, and execute the instructions 114 to determine, based on the output, a capability liveness that indicates whether or not the containerized service is able to provide the capability. The capability liveness is separate from a container liveness check (also referred to interchangeably herein as a "liveness check") that determines whether the container is responsive to requests. A container liveness check will now be described to distinguish container liveness checks from a capability liveness determined based on execution of the instructions 114. The container liveness check may include a request directed to a network port of the container to ensure that the container is responding to network requests. One example of such a container liveness check may include a liveness probe from the KUBERNETES container management platform.

Unlike the container liveness check, the capability liveness determined based on execution of instructions 114 may identify containerized services that are unable to provide their respective capabilities independently of whether or not a container is able to respond to a network request such as a container liveness check. As such, unlike a container liveness check, the capability liveness may assess whether the containerized service is able to provide a given capability, rather than simply checking to determine whether a container is responding to network requests.

The processor 102 may fetch, decode, and execute the instructions 116 to determine that the containerized service is unable to provide the capability based on the capability liveness. For example, the processor 102 may determine that the capability liveness indicates that the containerized service is executing while in a hung state and therefore is unable to provide the capability.

The processor 102 may fetch, decode, and execute the instructions 118 to cause the container to be restarted responsive to the determination that the containerized service is unable to provide the capability. In some examples, the processor 102 may cause the container to be restarted by indicating, to a container management system, that the container is to be restarted. For example, the processor 102 may update a file or other data structure to indicate that the container is to be restarted. The file or other data structure may be used by the container management system to determine whether or not to restart the container (or other containers managed by the container management system). In some examples, the container management system may execute on a master node of a container platform. The master node may restart other nodes of the container platform, including a node on which the container executes.

FIG. 2A shows an example system 200A that may provide containerized service capability liveness tracking. The system 200A may include a container 201, a log aggregator 230, and a container management system 240. The container 201 may execute a containerized service 210, which may provide a capability 211 upon successful execution of the containerized service and produce an output 212 during execution. In some examples, the output 212 may include a STDOUT, STDERR, or other streaming output of the containerized service 210. In some examples, the output 212 may include a discrete file that includes output (other than the capability 211) generated by the containerized service 210.

An overview of the container management system 240 will be provided to illustrate liveness checks and a container restart mechanism used by the container management system 240. This description will be followed by a description of the capability liveness instructions 222 that determines a capability liveness, which is separate from the liveness checks.

The container management system 240 may include a liveness health-check 242 and container data 246. In some examples, the container data 246 may include bit fields associated with each container—including container 201—managed by the container management system 240. The value of the bit field may indicate that the corresponding container is to be restarted. It should be noted that other types of values, other than bit fields, may be used to indicate that a given container is to be restarted. In some examples, the container data 246 may be stored as a file or other data structure that is accessible to the container management system 240 and the capability liveness instructions 222.

The liveness health-check 242 may provide a liveness check, separate from the capability liveness determined by the capability liveness instructions 222, to the container 201 via port 202. The liveness check may include a network request to the port 202 to determine whether the container 201 is responsive to network requests on the port 202. If the container 201 is not responsive to these liveness checks, the liveness health-check 242 may set the bit field value in the container data 246 corresponding to the container 201 to indicate that the container 201 is to be restarted.

The liveness health-check 242 may periodically check the bit field values of the container data 246 and cause the container management system 240 to restart appropriate containers that have a corresponding bit field value that indicates that a restart is to be performed. For example, the container management system 240 may execute a command used by a container platform to restart containers. In a particular example, the container management system 240 may use a command of the DOCKER container platform to restart containers. The DOCKER container platform may include a native command "docker restart [container]" where "[container]" is an identification of a container to be restarted. Other types of container platforms and associated restart commands may be used as well.

Although the liveness checks provided by the liveness health-check 242 may be able to determine whether the container 201 is responsive to network requests via port 202, such liveness checks may be unable to discern whether the containerized service 210 is able to provide the capability 211. For example, the containerized service 210 may be executing in a hung state that is unable to provide the capability 211 but still results in a positive response by the container 201 to the liveness check. In this example, the container management system 240 may determine that the container 201 is functioning properly and therefore not restart the container 201 even though the containerized service 210 may be unable to provide the capability 211. In another example, the containerized service 210 may not even require the port 202 to provide the capability 211 (such as instances in which the containerized service 210 provides a low-level service), in which case the liveness check may not be relevant to the containerized service 210. In this example, a liveness probe may not be relevant to determining whether the containerized service 210 is able to provide the capability 211.

The capability liveness instructions 222 may improve containerized systems to address the foregoing problems of containerized systems by determining whether a container is able to provide a capability. For example, as illustrated, the container 201 may execute capability liveness instructions 222, which may act as an agent that may intercept or otherwise access the output 212. The capability liveness instructions 222 may analyze the output 212 to determine whether the containerized service 210 is able to provide the capability 211.

In some examples, the capability liveness instructions 222 may analyze the output 212 based on a log pattern 213. A log pattern 213 may specify a set of one or more conditions that, if satisfied by the output 212, may indicate a certain state of the containerized service 210. In particular, the log pattern 213 may include non-compound and compound pattern rules that include patterns of the output 212 that indicate a state of the containerized service 210. More particularly, the log pattern 213 may include patterns of the output 212 that indicate whether or not the containerized service 210 is able to provide the capability 211. The log pattern 213 may be accessible to the capability liveness instructions 222, such as being stored in a file in the container 201 or other location accessible to the capability liveness instructions 222.

Examples of log patterns 213 that include non-compound pattern rules (1)-(5) are provided for illustrative purposes. Other numbers and types of patterns may be included in the log patterns 213.

(1) Single log message:

```
{
"pattern": "FATAL Failed to locate the controller"
}
```

In an example, the capability liveness instructions 222 may parse the output 212 to determine whether they match or otherwise include the single log messages, such as an illustrated single log message in (1). Based on a match, the capability liveness instructions 222 may determine that the containerized service 210 is in a particular state. More particularly, the capability liveness instructions 222 may determine that the containerized service 210 is unable to provide the capability 211.

(2) Regular expression patterns:

```
{
"pattern": "ERROR*StorageException*"
}
```

In an example, the capability liveness instructions 222 may parse the output 212 to determine whether the output matches a regular expression, such as an illustrated regular expression in (2). Based on a match, the capability liveness instructions 222 may determine that the containerized service 210 is in a particular state. More particularly, the capability liveness instructions 222 may determine that the containerized service 210 is unable to provide the capability 211.

(3) A pattern with repeat threshold:

```
{
"pattern": "FATAL Failed to locate the controller",
"threshold_count": 6
}
```

In an example, the capability liveness instructions 222 may parse the output 212 to determine whether the output matches a log message a certain number of times, such as a log message and "6" times illustrated in (3). For example, the capability liveness instructions 222 may determine whether the output 212 includes the log message 6 times (or more) indicating that the containerized service 210 outputted the log message 6 or more times. The foregoing may indicate that the containerized service 210 is unable to correct an error after 6 or more attempts. Based on a match, the capability liveness instructions 222 may determine that the containerized service 210 is in a particular state. More particularly, the capability liveness instructions 222 may determine that the containerized service 210 is unable to provide the capability 211.

(4) A pattern with repeat and time threshold:

```
{
    "pattern": "FATAL Failed to locate the controller",
    "threshold_count": 3,
    "within_time_seconds": 60
}
```

In an example, the capability liveness instructions 222 may parse the output 212 as in (3), but may also add that the threshold count be achieved within a certain time threshold, such as 60 seconds. The foregoing may indicate that the containerized service 210 is unable to correct an error after N (such as 3) or more attempts within a certain time threshold, such as 60 seconds. Based on a match, the capability liveness instructions 222 may determine that the containerized service 210 is in a particular state. More particularly, the capability liveness instructions 222 may determine that the containerized service 210 is unable to provide the capability 211.

(5) An expected heartbeat and a time threshold:

```
{
    "pattern": "INFO Processed * messages with * active threads",
    "heartbeat_threshold_seconds": 300
}
```

In an example, the capability liveness instructions 222 may parse the output 212 to determine whether the output indicates a certain level of activity in a certain threshold time (such as 300 seconds). For example, the capability liveness instructions 222 may determine whether the output 212 includes messages that indicate certain activity occurred in a threshold time period. The capability liveness instructions 222 may determine that the containerized service 210 is in a particular state based on the activity within the threshold time period. More particularly, the capability liveness instructions 222 may determine that the containerized service 210 is unable to provide the capability 211 based on the activity within the threshold time period.

Examples of log patterns 213 that include compound pattern rules are provided for illustrative purposes. These compound rules may include a compound pattern that may combine two or more of the rules (1)-(5) and/or other rules in which the capability liveness instructions 222 determines that the containerized service 210 is unable to provide the capability 211 based on a match between the output 212 and the two or more pattern rules.

```
{
    "patterns": [{
        "id": "CONTROLLER_FAILED",
        "pattern": "FATAL Failed to locate the controller",
        "threshold_count": 6
    }, {
        "id": "STORAGE_ERROR",
        "pattern": "ERROR*StorageException*",
```

```
        "threshold_count": 3,
        "within_time_seconds": 60
    }, {
        "id": "MISSING_HEARTBEAT",
        "pattern": "INFO Processed * messages with * active threads",
        "heartbeat_threshold_seconds": 300
    }],
    "rule": "CONTROLLER_FAILED OR (STORAGE_ERROR AND MISSING_HEARTBEAT)"
}
```

In some examples, the log pattern 213 may be dynamically updated at any time—any newly discovered patterns that indicate an inability of a service to perform a capability may be added to the log pattern 213 used by the capability liveness instructions 222. Likewise, existing patterns may be revised, and irrelevant patterns may be deleted.

Responsive to a determination that the containerized service 210 is unable to provide the capability 211 (such as when the output 212 matches a pattern specified in the log pattern 213, the capability liveness instructions 222 may cause the container 201 to be restarted. For example, the capability liveness instructions 222 may write an indication in the container data 246 that the container 201 is to be restarted (thereby restarting the containerized service 210). In this example, the capability liveness instructions 222 may leverage the restart mechanism of the liveness health-check 242. As previously described, the container management system 240 may periodically check the container data 246 to identify containers to be restarted based on a bit field or other value that indicates that corresponding containers are to be restarted. The container management system 240 may restart the identified containers.

In some examples, during or after analyzing the output 212, the capability liveness instructions 222 may pass the output 212 to the log aggregator 230. The log aggregator 230 may generate a log of the output 212 and pass the log to the container management system 140. The container management system 140 may store the log for later access, the details of which are omitted since they are not pertinent to this disclosure.

In some examples, the log pattern 213 may combine log patterns relating to multiple containerized services 210 on multiple containers 201 to determine the capability liveness of the containerized services 210. For example, the capability liveness instructions 222 may communicate with other capability liveness instructions 222 executing on other containers 201 via a message bus (which may be provided by an underlying node that hosts the containers 201). The capability liveness instructions 222 may use the combined log patterns to determine a capability liveness of the containerized services 210. In particular, if a first containerized service 210 on a first container 201 has a specific log pattern (in the output such as STDOUT) and there is a corresponding specific log pattern in a second output of a second containerized service 210 on a second container 201, then the capability liveness instructions 222 (of one, some or all of the containers 201) may determine the capability liveness of the first containerized service 210, the second containerized service 210, and/or other containerized services 210 for which their outputs and log patterns have been combined.

Alternatively, the log aggregator 230 may aggregate the outputs 212 from various containerized services 210 and provide the aggregated outputs 212 for combined analysis to the capability liveness instructions 222 of one, some or all of the containers 201.

It should be noted that the capability liveness instructions 222 may be stored at the memory 110 and executed by the processor 102, both of which are illustrated in FIG. 1. It should be further noted that the capability liveness instructions 222 may include some or all of the instructions 112-118 illustrated in FIG. 1, instructions that facilitate the operations illustrated in FIGS. 4 and 5, and/or other instructions.

Figure 2B:
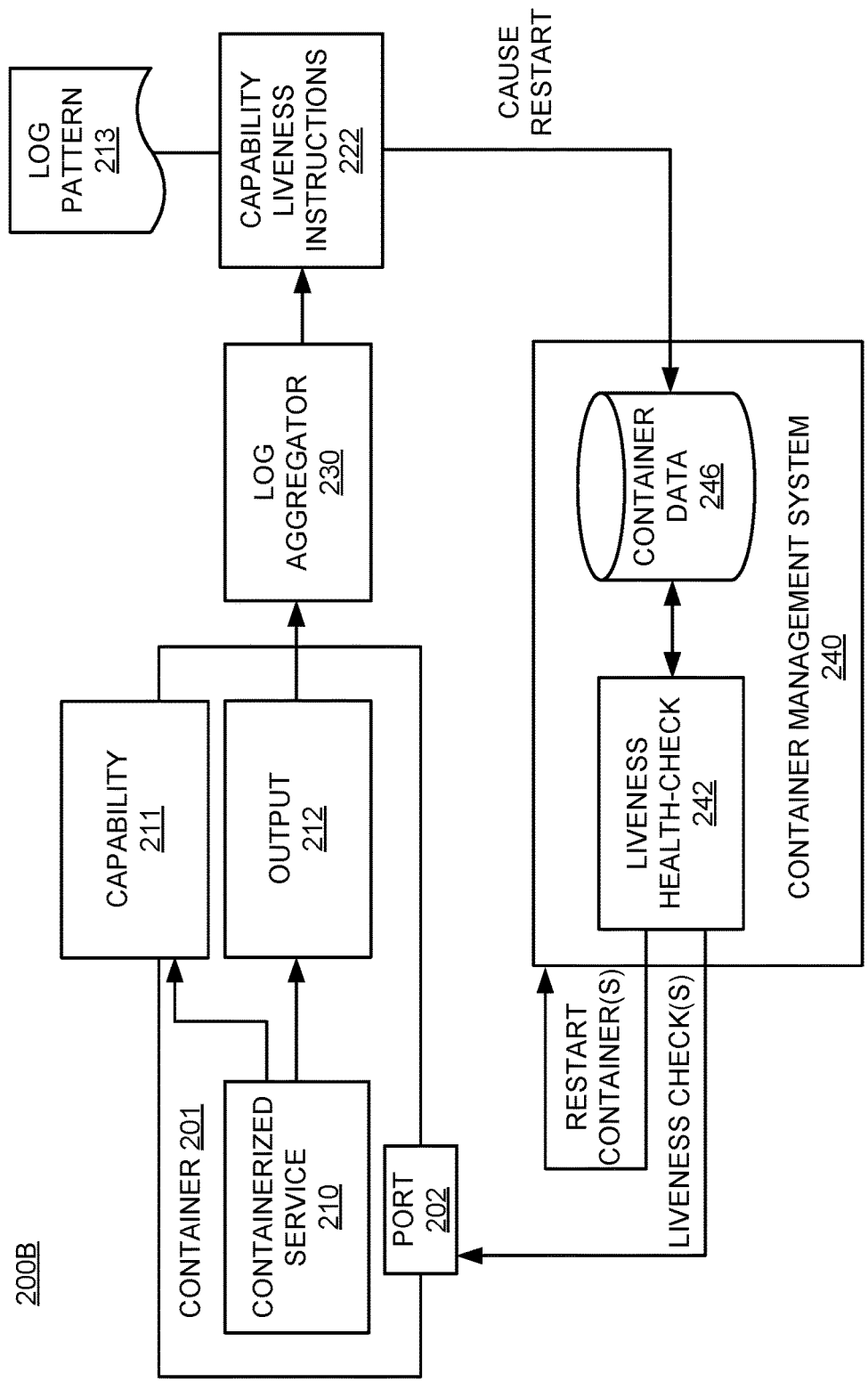

FIG. 2B shows an example system 200B that may provide containerized service capability liveness tracking. The system 200B may operate similarly to the system 200A described with respect to FIG. 2A except that the capability liveness instructions 222 is downstream of the log aggregator 230. In other words, the capability liveness instructions 222 may obtain the output 212 from the log aggregator 230. It should be noted that the log aggregator 230 illustrated in FIG. 2B may aggregate outputs of multiple containers managed by the container management system 240, and may provide access to the aggregated outputs (including output 212) to the capability liveness instructions 222. In some examples, the capability liveness instructions 222 may be executed in a central location separate from the container 201 or may be included within the container 201, so long as the capability liveness instructions 222 have access to the log aggregator 230.

Figure 2C:
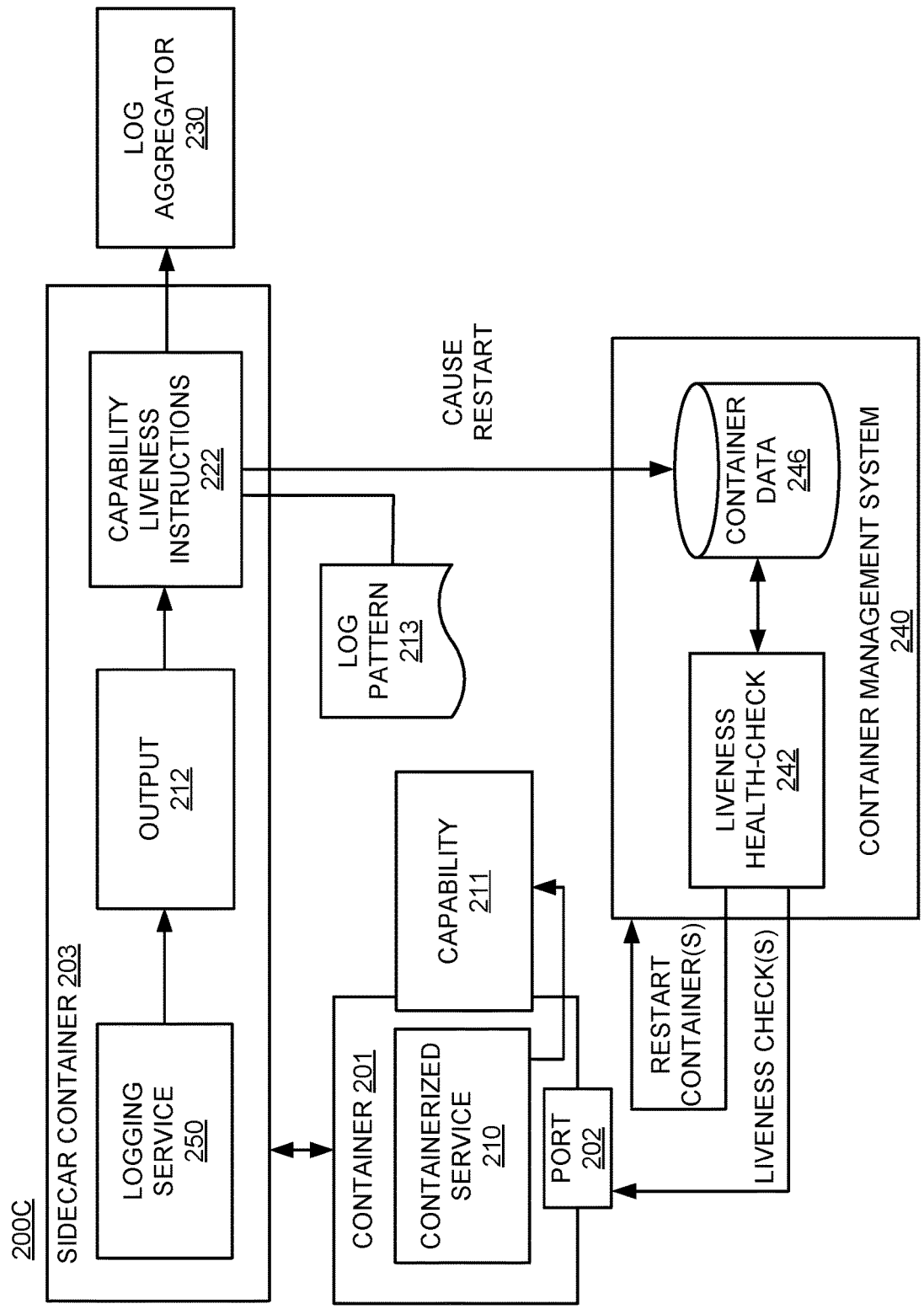

FIG. 2C shows an example system 200C that may provide containerized service capability liveness tracking. The system 200C may operate similarly to the system 200A described with respect to FIG. 2A except that the capability liveness instructions 222 may operate in a sidecar container 203 that operates in a sidecar pattern with the container 201. For example, the sidecar container 203 may include a logging service 250 that obtains the output 212 from the container 201 and provides the output to the capability liveness instructions 222.

Figure 2D:
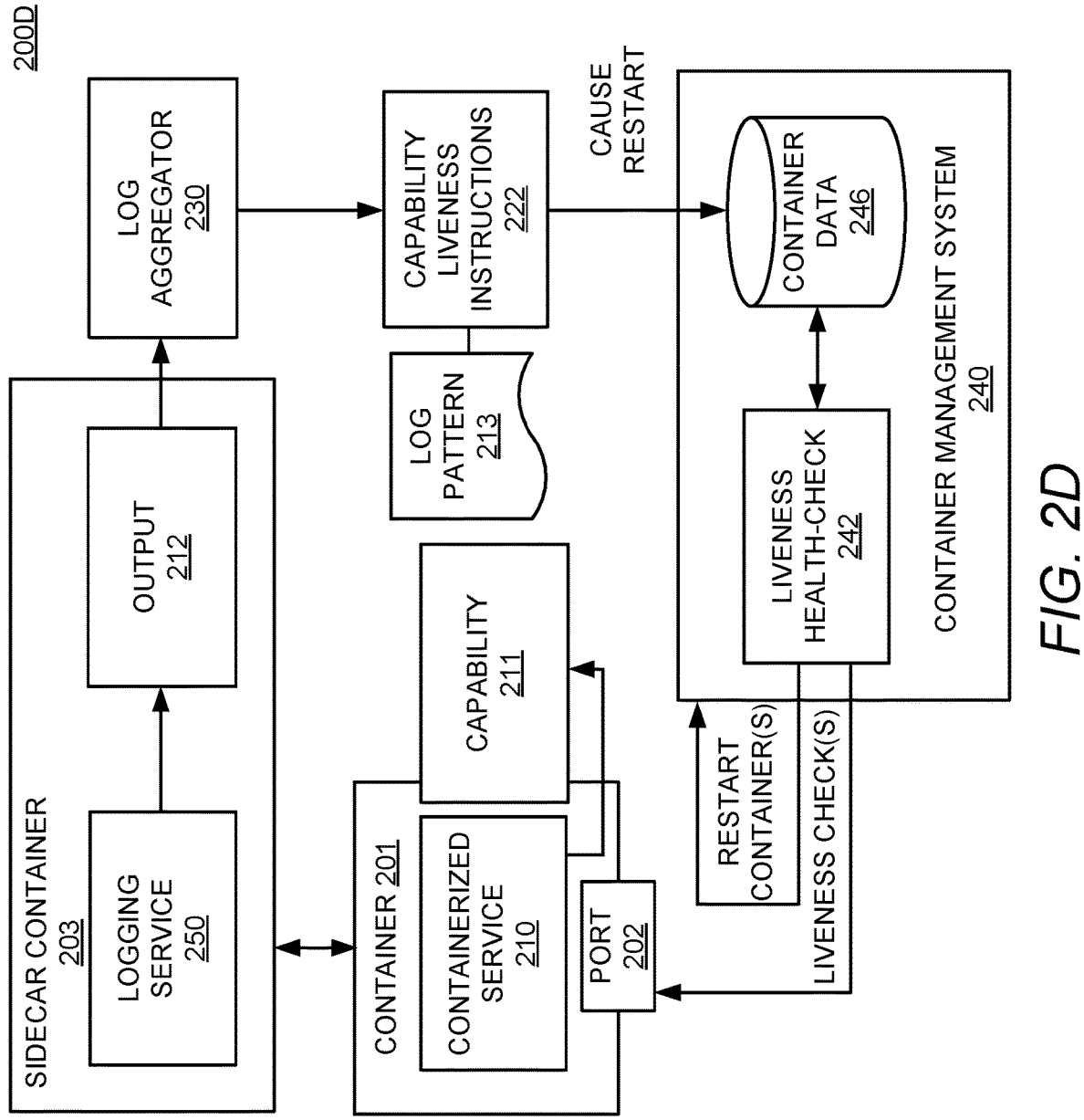

FIG. 2D shows an example system 200D that may provide containerized service capability liveness tracking. The system 200D may operate similarly to the system 200C described with respect to FIG. 2C using a sidecar container 203 except that the capability liveness instructions 222 may access the output 212 from the log aggregator 230 (in a manner similar to the system 200B illustrated in FIG. 2B).

FIG. 3 shows a block diagram 300 of an example apparatus 100 that may act as a node that hosts containers. In some examples, the apparatus 100 may provide the underlying hardware (such as processor 102 and memory 110) to serve as a node that hosts one or more containers 201A-N. Each of the containers 201A-N may include a respective copy of capability liveness instructions 222A-N. In some of these examples, the apparatus 100 may host the capability liveness instructions 222 for execution on the processor 102 on behalf of a container 201. In some examples, the apparatus 100 may provide an operating system used by each of the containers 201. Alternatively, the apparatus 100 may provide a virtual machine that is able to host individual operating systems for use by different containers 201.

In some examples, the apparatus 100 may include a worker node that takes instruction from a master node (not illustrated). For example, the master node may include the container management system 140 illustrated in FIG. 1 and provide instructions to the apparatus 100 to restart various ones of the containers 201 hosted by the apparatus 100. In other examples, the apparatus 100 may include the container management system 140 illustrated in FIG. 1. In these examples, the apparatus 100 determines which ones of the containers 201 hosted by the apparatus 100 is to be restarted.

Figure 4:
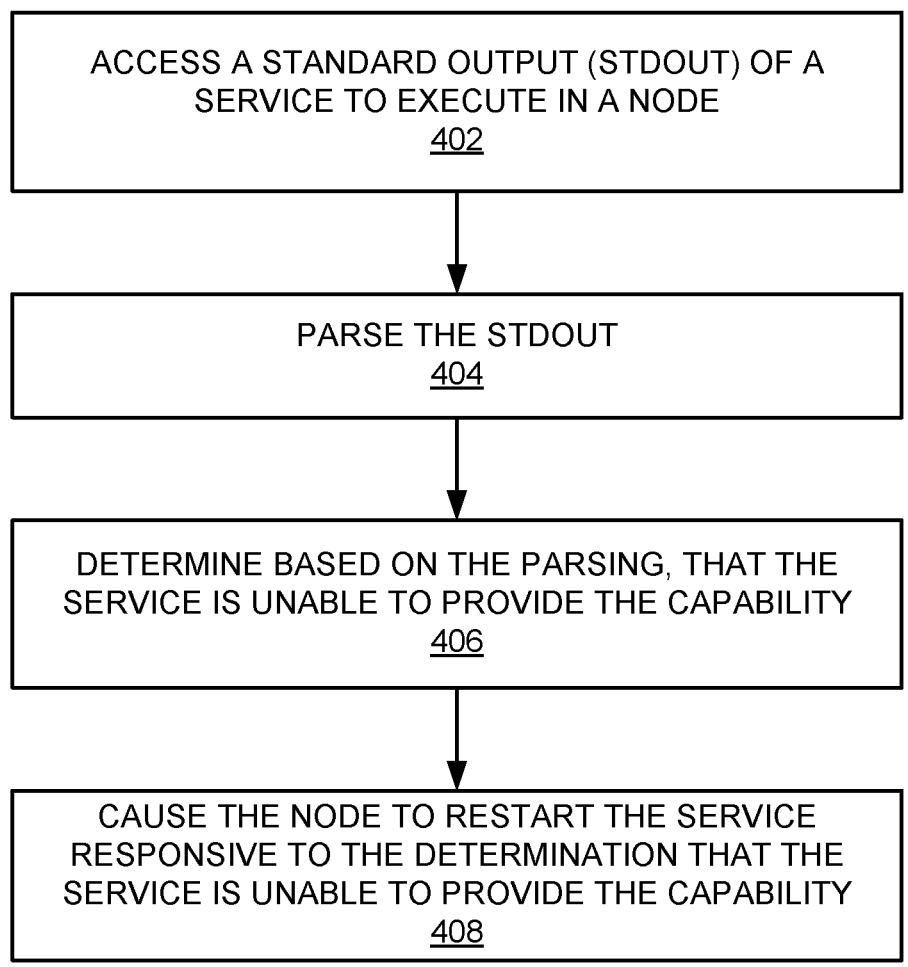
FIG. 4 depicts a flow diagram of an example method for containerized service capability liveness tracking.

Various manners in which the apparatus 100 may operate to perform capability liveness checks are discussed in greater detail with respect to the method 400 depicted in FIG. 4. It should be understood that the method 400 may include additional operations and that some of the operations described therein may be removed and/or modified without departing from the scopes of the method 400. The descriptions of the method 400 may be made with reference to the features depicted in FIGS. 1 and 2A-D for purposes of illustration.

FIG. 4 depicts a flow diagram of an example method 400 for containerized service capability liveness tracking.

As shown in FIG. 4, at block 402, the processor 102 may access a standard output (STDOUT) of a service to execute in a node, wherein the service is to provide a capability based on successful execution of the service in the node. Other types of output of the service may be accessed as well or instead of the STDOUT.

At block 404, the processor 102 may parse the STDOUT. In this example, the output (STDOUT) of the service may be parsed in real-time as the service generates the output.

At block 406, the processor 102 may determine, based on the parsing, that the service is unable to provide the capability. For example, the processor 102 may determine that the service is in a hung state or other state that is unable to provide the capability.

At block 408, the processor 102 may cause the node restart the service responsive to the determination that the service is unable to provide the capability. For example, the node may host a container and the service may include a containerized service executing in the container. In this example, the processor 102 may cause a container management system (operating on the node) to restart the container.

Some or all of the operations set forth in the method 400 may be included as utilities, programs, or subprograms, in any desired computer accessible medium. In addition, the method 400 may be embodied by computer programs, which may exist in a variety of forms. For example, some operations of the method 400 may exist as machine-readable instructions, including source code, object code, executable code or other formats. Any of the above may be embodied on a non-transitory computer readable storage medium. Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

FIG. 5 depicts a block diagram of an example non-transitory machine-readable storage medium 500 for containerized service capability liveness tracking. The non-transitory machine-readable storage medium 500 may be an electronic, magnetic, optical, or other physical storage device that includes or stores executable instructions. The non-transitory machine-readable storage medium 500 may be, for example, Random Access memory (RAM), an Electrically Erasable Programmable Read-Only Memory (EEPROM), a storage device, an optical disc, and the like. The non-transitory machine-readable storage medium 500 may have stored thereon machine-readable instructions 502-508 that a processor, such as the processor 102, may execute.

The machine-readable instructions 502 may cause the processor to access an output of a service to execute in a container, wherein the service is to provide a capability based on successful execution of the service in the container. The machine-readable instructions 504 may cause the processor to parse the output based on a log pattern, such as a log pattern 213. The machine-readable instructions 506 may cause the processor to determine, based on the parsed output, that the service is in a hung state without exiting. The machine-readable instructions 508 may cause the processor to cause the container to be restarted responsive to the determination that the service is in the hung state.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   a processor; and
   a non-transitory computer readable medium on which is stored instructions that when executed by the processor, cause the processor to:
   access an output of a containerized service, wherein the containerized service is to execute in a container and is to provide a capability based on successful execution of the containerized service in the container;
   determine, based on the output, a capability liveness that indicates whether the containerized service is able to provide the capability, wherein the capability liveness is separate from a container liveness check that determines whether the container is responsive to requests;
   wherein to determine the capability liveness based on the output, the instructions, when executed by the processor, cause the processor to: access a set of log patterns associated with the containerized service having an inability to provide the capability; parse the output based on the set of log patterns; and determine whether the output matches one or more log patterns from among the set of log patterns;
   determine that the containerized service is unable to provide the capability based on the determined capability liveness; and
   cause the container to be restarted responsive to the determination that the containerized service is unable to provide the capability.

2. The apparatus of claim 1, wherein to access the output, the instructions, when executed by the processor, cause the processor to:
   intercept a standard output (STDOUT) of the containerized service.

3. The apparatus of claim 2, wherein to cause the container to be restarted, the instructions, when executed by the processor, cause the processor to:
   update a file to indicate that the container is to be restarted, wherein the file is used by a container management system to determine whether to restart the container.

4. The apparatus of claim 3, wherein the container management system comprises a master node that is to restart the container based on the file.

5. The apparatus of claim 1, wherein to determine that the containerized service is unable to provide the capability, the instructions, when executed by the processor, cause the processor to:
   determine that the containerized service is executing while in a hung state.

6. The apparatus of claim 1, wherein the containerized service provides the capability without accessing a network port used by the container, wherein the container liveness check provides requests to the network port to determine whether the container is responsive to the requests.

7. The apparatus of claim 6, wherein the container liveness check comprises a liveness probe.

8. The apparatus of claim 1, wherein to access the set of log patterns, the instructions, when executed by the processor, cause the processor to:
   access a file that includes the set of log patterns.

9. The apparatus of claim 1, wherein the set of log patterns comprises a pattern with a repeat threshold, and wherein to parse the output, the instructions, when executed by the processor, cause the processor to:
   determine a number of times that the output includes the pattern;
   compare the number of times to the repeat threshold; and
   determine whether the number of times exceeds the repeat threshold.

10. The apparatus of claim 1, wherein the set of log patterns comprises a pattern with a repeat threshold and a time threshold, and wherein to parse the output, the instructions, when executed by the processor, cause the processor to:
    determine a number of times that the output includes the pattern; and
    determine whether the number of times exceeds the repeat threshold within the time threshold.

11. The apparatus of claim 1, wherein the set of log patterns comprises an expected heartbeat and a time threshold.

12. The apparatus of claim 1, wherein the set of log patterns comprises a compound pattern.

13. The apparatus of claim 1, wherein to access the output, the instructions, when executed by the processor, cause the processor to:
    execute, within the container, an agent that parses the output.

14. The apparatus of claim 1, wherein to access the output, the instructions, when executed by the processor, cause the processor to:
    execute, within a sidecar container separate from the container, an agent that parses the output.

15. A method comprising:
    accessing, by a processor, a standard output (STDOUT) of a service to execute in a node, wherein the service is to provide a capability based on successful execution of the service in the node;
    parsing, by the processor, the STDOUT;
    determining, by the processor, based on the parsing, that the service is unable to provide the capability;
    wherein to determining that the service is unable to provide the capability comprises: accessing a set of log patterns associated with the service having an inability to provide the capability; parsing the STDOUT based on the set of log patterns; and determining whether the STDOUT matches one or more log patterns from among the set of log patterns; and causing, by the processor, the node to restart the service responsive to the determination that the service is unable to provide the capability.

16. The method of claim 15, wherein the node hosts a container and the service comprises a containerized service, and wherein causing the node to restart the service comprises causing a container management system to restart the container.

17. The method of claim 16, wherein parsing the STDOUT comprises parsing the STDOUT in real-time as the service generates the STDOUT.

18. A non-transitory computer readable medium on which is stored machine readable instructions that when executed by a processor, cause the processor to:
- access an output of a service to execute in a container, wherein the service is to provide a capability based on successful execution of the service in the container;
- parse the output based on a log pattern;
- determine, based on the parsed output, that the service is in a hung state without exiting;
- wherein to determine that the service is in a hung state without exiting comprises: accessing a set of log patterns associated with the service having an inability to provide the capability; parse the output based on the set of log patterns; and determine whether the output matches one or more log patterns from among the set of log patterns; and
- cause the container to be restarted responsive to the determination that the service is in the hung state.

19. The non-transitory computer readable medium of claim 18, wherein the output comprises a standard output (STDOUT) of the service, and wherein the instructions, when executed by the processor, cause the processor to:
- pass the STDOUT to a log aggregator after the STDOUT has been parsed.

* * * * *